(12) United States Patent (10) Patent No.: US 8,866,329 B2
Tanabe (45) Date of Patent: Oct. 21, 2014

(54) TIDAL POWER GENERATING DEVICE

(71) Applicant: Akinori Tanabe, Kakogawa (JP)

(72) Inventor: Akinori Tanabe, Kakogawa (JP)

(73) Assignee: Akinori Tanabe, Kakogawa (JP)

( * ) Notice: Subject to any disclaimer, the term of this patent is extended or adjusted under 35 U.S.C. 154(b) by 3 days.

(21) Appl. No.: 13/913,980

(22) Filed: Jun. 10, 2013

(65) Prior Publication Data

US 2013/0328311 A1 Dec. 12, 2013

(30) Foreign Application Priority Data

Jun. 11, 2012 (JP) ................................. 2012-144703

(51) Int. Cl.
 *F03B 13/10* (2006.01)
 *F03B 13/26* (2006.01)
(52) U.S. Cl.
 CPC ............. *F03B 13/26* (2013.01); *F05B 2250/25* (2013.01); *F05B 2260/4031* (2013.01); *F05B 2260/4021* (2013.01); *Y02E 10/28* (2013.01); *F03B 13/264* (2013.01); *F05B 2240/61* (2013.01)
 USPC .......................................................... 290/54
(58) Field of Classification Search
 CPC ...................................................... F03B 13/26
 USPC ............................................................ 290/53
 See application file for complete search history.

(56) References Cited

U.S. PATENT DOCUMENTS

| 3,233,574 A | * | 2/1966 | Justinen | 416/84 |
| 4,524,285 A | * | 6/1985 | Rauch | 290/43 |
| 4,849,647 A | | 7/1989 | McKenzie | |
| 7,633,174 B1 | | 12/2009 | Feiler | |
| 2002/0088222 A1 | * | 7/2002 | Vauthier | 60/398 |

FOREIGN PATENT DOCUMENTS

| GB | 2468853 A | * | 9/2010 | .............. F03B 17/06 |
| JP | 2004293352 A | | 10/2004 | |
| JP | 2005502821 A | | 1/2005 | |
| JP | 2013002438 A | | 1/2013 | |
| WO | WO-03025385 A2 | | 3/2003 | |
| WO | WO 2011048466 A1 | * | 4/2011 | |

* cited by examiner

*Primary Examiner* — Joseph Waks
(74) *Attorney, Agent, or Firm* — Marshall, Gerstein & Borun LLP

(57) ABSTRACT

A tidal power generating device having a large area to receive pressure of a tidal current and can be used in a water surface region. The tidal power generating device includes a cylindrical body that floats by itself and a blade that is continuously provided from a front portion to a rear portion on an outer periphery of the cylindrical body and has torsion in a single direction. The cylindrical body has an interior space through which a power generating nonrotary shaft, a connecting pipe, and a mooring nonrotary shaft pass. The power generating nonrotary shaft is provided with a fan-shaped weight and a power generator. The rear portion of the cylindrical body is sunk when the tidal power generating device is placed on water.

12 Claims, 8 Drawing Sheets

TIDAL POWER GENERATING DEVICE

BACKGROUND OF THE INVENTION

1. Field of the Invention

The present invention relates to a tidal power generating device for generating electricity with use of a water current such as a tidal current.

2. Description of Related Art

There are various types of tidal power generating devices, such as a device for generating electricity with use of a propeller sunk completely in the water (e.g. JP 2005-502821 W) and a device including a hull or the like and a power generator provided with a propeller and located on the hull (e.g. JP 2004-293352 A).

However, there are still problems for practical use.

(1) The power generating device provided with a propeller sunk completely in the water as in JP 2005-502821 W has the following problems.

The device has a small area to receive pressure of a tidal current.

The device cannot be used in a water surface region where a current is relatively fast.

(2) The power generating device including a hull and a power generator provided with a blade and located on the hull as in JP 2004-293352 A has the following problem.

Waste flowing on the water surface is likely to be caught at a portion connecting the hull and the power generator provided with the blade and a shaft of the power generator.

SUMMARY OF THE INVENTION

The present invention has been achieved to solve these problems.

In order to solve these problems, the present invention provides a tidal power generating device including: a bottomed cylindrical body floating by itself; a blade provided continuously from a front portion to a rear portion on an outer periphery of the cylindrical body and has torsion in a single direction, wherein the cylindrical body includes therein: a power generating nonrotary shaft located coaxially at the rear portion of the cylindrical body; a weight fixed to the power generating nonrotary shaft; and a power generator fixed to at least one of the power generating nonrotary shaft and the weight, the power generator for generating electricity from torque of the cylindrical body.

In this configuration, the cylindrical body floats on the water while the rear portion of the cylindrical body is sunk by the weight. The tidal power generating device is favorable in terms of the waterproof property in comparison to those which are sunk in the water, and can be used in the water surface region where a current is relatively fast. The blade is provided from the front portion to the rear portion on the outer periphery of the cylindrical body, thereby realizing a large area to receive a tidal current and power generation efficiency improved in comparison to the conventional devices. The area to receive a tidal current can be further enlarged by increasing the length of the cylindrical body. The attached portion and the shaft of the power generator are provided in the cylindrical body. In this configuration, waste is less likely to be caught at the attached portion and the shaft, thereby inhibiting unexpected stop or trouble. The tidal power generating device is favorable in terms of the waterproof measure in comparison to those which are sunk in the water. The tidal power generating device is not essentially provided with a hull and the like, which enables reduction in cost.

Preferably, the tidal power generating device further includes: a mooring nonrotary shaft provided coaxially at the front portion of the cylindrical body; and a connecting pipe connecting the power generating nonrotary shaft and the mooring nonrotary shaft.

More preferably, the rear portion of the cylindrical body is sunk and the mooring nonrotary shaft is kept exposed above water. In this configuration, the rear portion of the cylindrical body is sunk whereas the mooring nonrotary shaft at the front portion of the cylindrical body is exposed above the water. Thus, the mooring nonrotary shaft is less likely to catch waste.

The cylindrical body may have an axis inclined from a direction of a tidal current at (90°—a torsion angle of the blade) such that the tidal current hits a lowermost portion of the blade at a right angle. In this configuration, the cylindrical body is inclined so that a tidal current hits the lowermost portion of the blade at the right angle. The blade can thus reliably receive a tidal current even at the rear portion, so as to increase the pressure receiving area.

The tidal power generating device further includes: a link arm bent downward and provided at a front end of the cylindrical body so as to be connected with the mooring nonrotary shaft; a mooring rotary shaft provided at a rear end of the cylindrical body; and mooring ropes connected to the mooring nonrotary shaft and the mooring rotary shaft, respectively.

In this configuration, the link arm bent downward causes transverse force of a tidal current to be applied in the (downward) direction of the link arm as downward pulling force, which inhibits axial rotation of tidal power generating device. In addition, such axial rotation of the tidal power generating device is further inhibited by gravitating of the weight. The mooring ropes can retain the cylindrical body and keep the inclined state of the cylindrical body. The mooring ropes are each connected to an anchor or the like. The mooring rotary shaft is located at the rear end of the cylindrical body, so that rotation of the cylindrical body is less likely to twist the mooring ropes connected to the mooring nonrotary shaft and the mooring rotary shaft, respectively. As a result, the tidal power generating device tends to be kept at a constant position.

The link arm may have an angle of traverse limited so as to be kept in a "V" shape opened downward. In this configuration, the link arm bent in a "V" shape opened downward causes transverse force of a tidal current to be applied in the (downward) direction of the link arm as downward pulling force, which inhibits axial rotation of tidal power generating device. In addition, such axial rotation of the tidal power generating device is further inhibited by gravitating of the weight.

Preferably, the tidal power generating device further includes: a gear wheel fixed to the cylindrical body, the gear wheel for rotating coaxially with the cylindrical body; and torque of the cylindrical body is transmitted to the power generator by way of the gear wheel. In this configuration, rotation of the power generating nonrotary shaft is prevented by large gravitating of the fan-shaped weight even when the cylindrical body rotates, and torque of the cylindrical body is transmitted to the power generator by way of the gear wheel.

Preferably, the tidal power generating device further includes: a speed-up gear connected to the gear wheel and the power generator, the speed-up gear for transmitting torque of the cylindrical body to the power generator by way of the gear wheel. In this case, torque of the cylindrical body is transmitted to the gear wheel, the speed-up gear, and the power generator in this order.

Preferably, each of the power generating nonrotary shaft, the connecting pipe, and the mooring nonrotary shaft is provided with a hole through which a power cable passes. More preferably, the hole is large enough for a person to pass through. This configuration realizes transmission of electricity. It is also possible to perform maintenance work even during operation.

The tidal power generating device may further include: a watertight door provided at an outer end of the mooring nonrotary shaft.

The cylindrical body may have tapered front and rear ends.

The tidal power generating device according to the present invention includes, as a main body, the cylindrical body that floats by itself, and thus can be used in the water surface region where a current is relatively fast and can improve power generation efficiency. The weight is located at the rear portion in the cylindrical body, so that the rear portion of the cylindrical body sinks and the cylindrical body is inclined. In this configuration, even the rear portion of the blade provided on the outer periphery of the cylindrical body can receive a tidal current. This increases the area to receive pressure of a tidal current and enhances power generation efficiency. The power generator and the power generating rotary shaft are provided in the cylindrical body and are thus less likely to catch waste, with a result of inhibiting unexpected stop or trouble of the tidal power generating device.

DETAILED DESCRIPTION OF PREFERRED EMBODIMENTS

Embodiments of the present invention are described below with reference to the drawings, although the present invention is not limited to the following embodiments.

1. First Embodiment 1-1. Configuration of Tidal Power Generating Device

Figure 1:
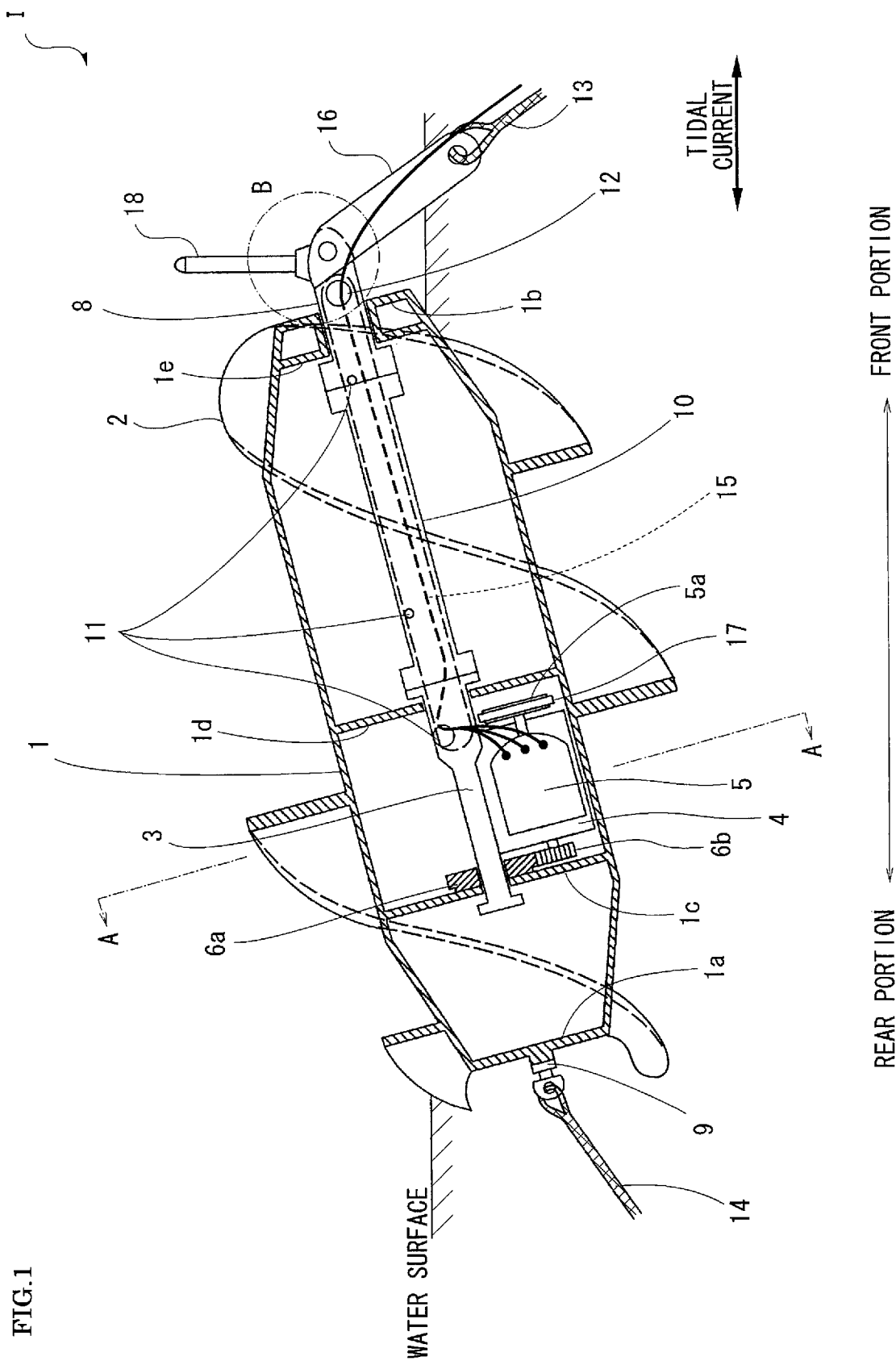
FIG. 1 is a side view of an internal structure of a tidal power generating device according to a first embodiment.
Figure 2:
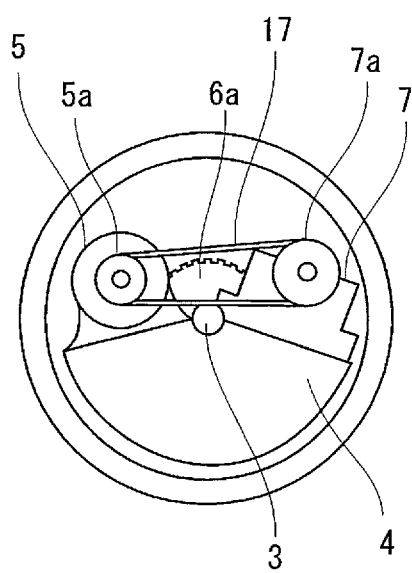
FIG. 2 is an enlarged end view taken along line A-A in FIG. 1 (with no blade 2 being included)
Figure 3:
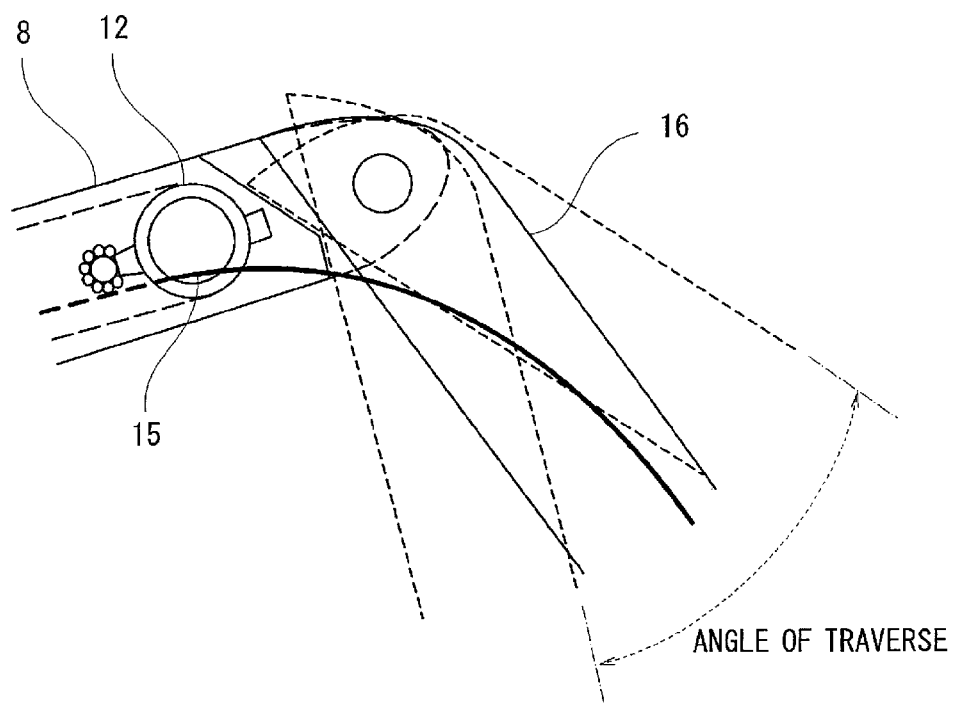
FIG. 3 is an enlarged view of a portion B in FIG. 1 (with no security lighting 18 being included)

FIG. 1 is a side view of an internal structure of a tidal power generating device according to the first embodiment of the present invention. FIG. 2 is an enlarged end view taken along line A-A in FIG. 1 (with no blade 2 being included). FIG. 3 is an enlarged view of a portion B in FIG. 1 (with no security lighting 18 being included).

As shown in FIG. 1, a tidal power generating device I includes a cylindrical body 1 and a blade 2 that is continuously provided from a front portion to a rear portion on an outer periphery and has torsion in a single direction. The cylindrical body 1 is tapered at around two axial ends, and has a first bottom 1a that is located at a front end and has a circular disk shape and a second bottom 1b that is located at a rear end and has a circular disk shape.

The cylindrical body 1 is further provided with a first partition 1c, a second partition 1d, and a third partition 1e each of which has a circular disk shape and divides a hollow interior space. The first bottom 1a, the first partition 1c, the second partition 1d, and the third partition 1e are each provided, at the center thereof, with a hole through which a power generating nonrotary shaft 3, a connecting pipe 10, or a mooring nonrotary shaft 8, to be described later, passes.

As shown in FIG. 1, the cylindrical body 1 is provided therein with the power generating nonrotary shaft 3 coaxially at the rear portion of the cylindrical body 1, the mooring nonrotary shaft 8 coaxially at the front portion thereof, and the connecting pipe 10 connecting the power generating nonrotary shaft 3 and the mooring nonrotary shaft 8. The power generating nonrotary shaft 3 has a fan-shaped weight 4 fixed thereto.

The tidal power generating device I has the center of gravity at the rear portion thereof because the fan-shaped weight 4 is located at the rear portion of the cylindrical body 1, which sinks in the water. The fan-shaped weight 4 is located low due to gravitating to suppress rotation of the power generating nonrotary shaft 3. Accordingly, only the cylindrical body 1 rotates while rotation of the power generating nonrotary shaft 3 is suppressed, thereby reducing loss of rotation energy of the cylindrical body 1.

In the present embodiment, the mooring nonrotary shaft 8 located at the front portion of the tidal power generating device I is set so as to be slightly exposed above the water. The angle and the amount of the mooring nonrotary shaft 8 exposed above the water can be changed by changing the weight or disposition of the fan-shaped weight 4. The weight or disposition of the fan-shaped weight 4 can be set in consideration of the longitudinal weight balance of the tidal power generating device I. The fan-shaped weight 4 has a power generator 5 and a speed-up gear 7 fixed thereto (see FIG. 2).

As shown in FIG. 1, the first partition 1c of the cylindrical body 1 has a first gear wheel 6a fixed thereto. The speed-up gear 7 has a shaft to which a second gear wheel 6b is attached. The first gear wheel 6a and the second gear wheel 6b engage with each other. In this configuration, rotation of the cylindrical body 1 causes the first gear wheel 6a to rotate, and rotation of the first gear wheel 6a is transmitted to the second gear wheel 6b to cause the second gear wheel 6b to rotate.

As shown in FIGS. 1 and 2, the power generator 5 has a shaft to which a first pulley 5a is attached, and the shaft of the speed-up gear 7 has a second pulley 7a attached thereto. These pulleys 5a and 7a have a belt 17 attached thereto. Accordingly, rotation of the speed-up gear 7 is transmitted to the power generator 5. In these configurations, rotation of the cylindrical body 1 is transmitted to the first gear wheel 6a, the second gear wheel 6b, the speed-up gear 7, the pulley 7a, the belt 17, the pulley 5a, and the power generator 5 in this order, and the power generator 5 thus generates electricity.

As shown in FIGS. 1 and 3, the mooring nonrotary shaft 8 has a distal end provided with a link arm 16 that is bent downward, and the link arm 16 has a lower end provided with a mooring rope 13. The cylindrical body 1 is provided at the rear portion with a mooring rope 14. The mooring ropes 13 and 14 are each provided with an anchor (not shown) that moors the tidal power generating device I.

As shown in FIG. 3, the link arm 16 is kept in the bent shape and has an angle of traverse limited so as to be kept in a "V" shape. The link arm 16 turns within a predetermined range so as to absorb movement of waves. The mooring nonrotary shaft 8 connected to the link arm 16 does not rotate, whereas the cylindrical body 1 is provided at the rear portion with a mooring rotary shaft 9 that is rotatable. In this configuration, the mooring rope 14 connected to the mooring rotary shaft 9 does not rotate even when the cylindrical body 1 rotates, thereby inhibiting twist of the mooring rope 14.

The power generating nonrotary shaft 3, the connecting pipe 10, and the mooring nonrotary shaft 8 are hollow and each provided therein with a space. These configurations allow a person to enter the tidal power generating device I in operation (while the cylindrical body 1 is rotating) and enable maintenance work even in operation of the tidal power generating device I. The mooring nonrotary shaft 8 is provided with a watertight door 12, through which a person can enter the device.

There can be provided with a power cable 15 that passes through these interior spaces, so as to transmit electricity generated by the power generator 5. The power cable 15 is preferably made waterproof. In a case of transmitting the generated electricity to land, the power cable 15 can be located along the mooring rope 13 and the bottom of the sea to reach the land. The power generating nonrotary shaft 3, the connecting pipe 10, and the mooring nonrotary shaft 8 are each provided with a hole 11 that allows the power cable 15 to be drawn out of the hole 11. The distal end of the mooring nonrotary shaft 8 is provided with security lighting 18.

1-2. Exemplary Placement of Tidal Power Generating Device

Figure 4:
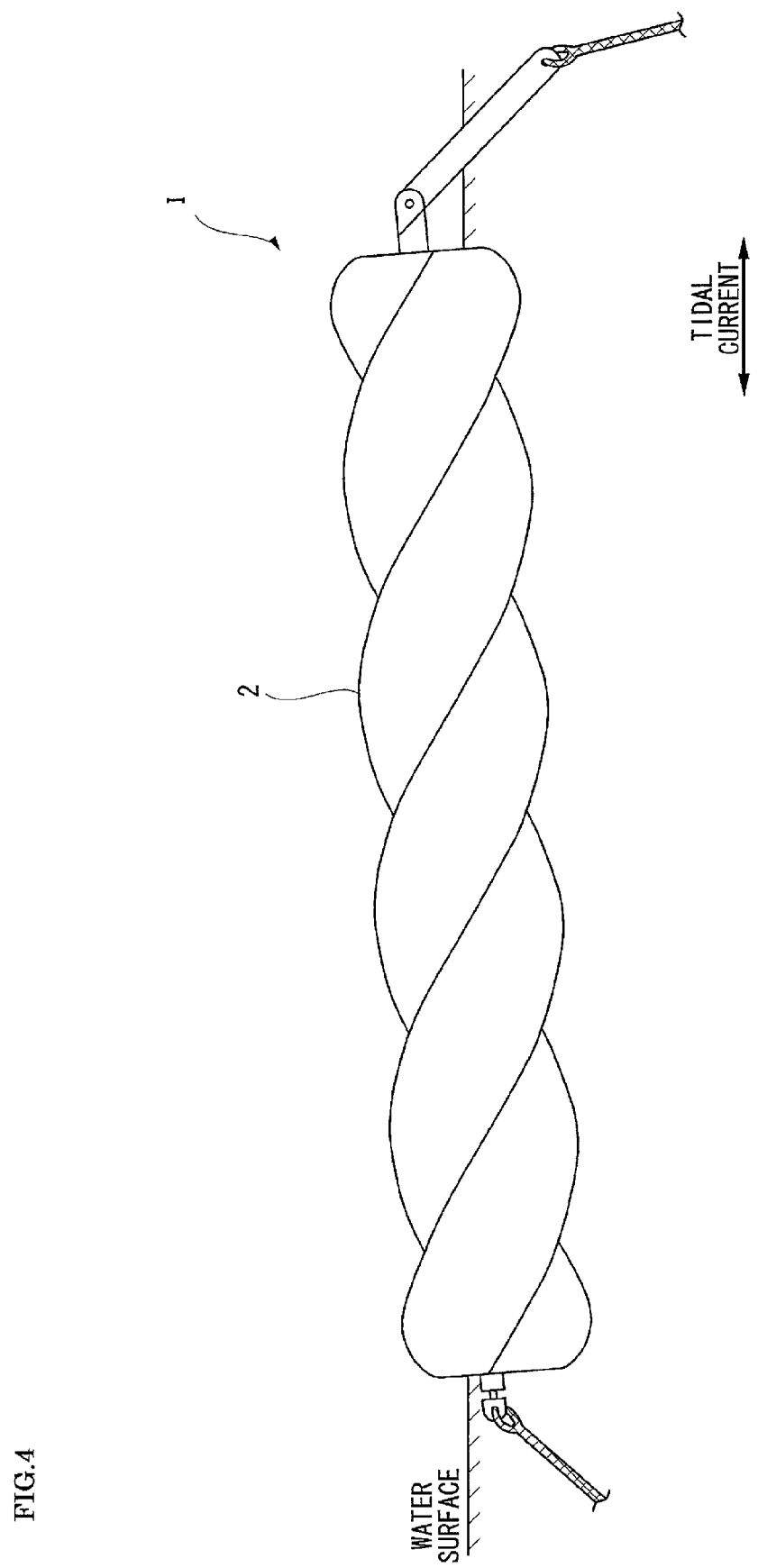
FIG. 4 is an explanatory view showing an exemplary placement state of the tidal power generating device according to the first embodiment.
Figure 5:
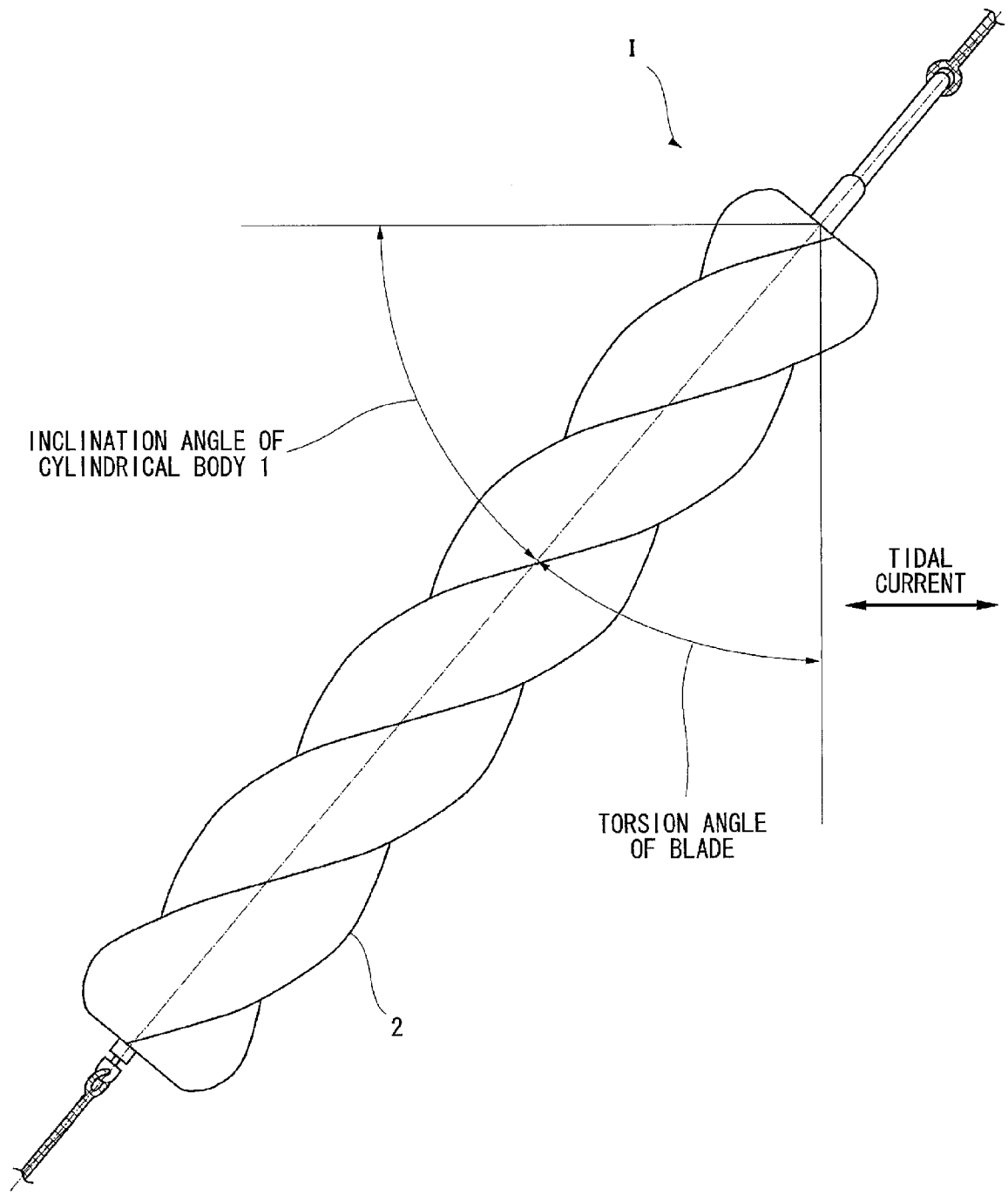
FIG. 5 is an explanatory view showing an exemplary placement state of the tidal power generating device according to the first embodiment.

FIG. 4 is an explanatory view from a side, showing an exemplary placement state of the tidal power generating device I. FIG. 5 is an explanatory view from the top, showing an exemplary placement state of the tidal power generating device I. As shown in FIG. 4, the tidal power generating device I can be placed with respect to the water level such that the rear portion is partially sunk and the entire body is slightly inclined, for example. In this state, the blade 2 is capable of receiving a fast tidal current in the water surface region. Furthermore, a tidal current entirely hits the blade 2 from the front portion to the rear portion, thereby increasing the pressure receiving area. The tidal power generating device I is inclined upward from the rear portion to the front portion and the mooring nonrotary shaft 8 located at the front portion of the cylindrical body 1 is exposed above the water, so as to prevent the mooring nonrotary shaft 8 from catching waste.

As shown in FIG. 5, the tidal power generating device I can be placed with respect to a plane so as to be inclined at the angle (90°—a torsion angle of the blade) from a tidal current, for example. In this state, a tidal current entirely hits the blade 2 from the front portion to the rear portion, thereby increasing the pressure receiving area. Placement of the tidal power generating device I as shown in FIGS. 4 and 5 enhances power generation efficiency. The tidal power generating device I according to the present embodiment can be used not only in the sea but also in a middle or downstream region of a river.

1-3. Effects of the Present Embodiment

The tidal power generating device I according to the present embodiment achieves the following effects.

(1) According to the present embodiment, the tidal power generating device I is provided with the cylindrical body 1 that floats by itself. The cylindrical body 1 floats on the water while the rear portion thereof is sunk by the fan-shaped weight 4. The tidal power generating device I can be thus used in the water surface region where a current is relatively fast. The tidal power generating device is favorable in terms of the waterproof property in comparison to those which are sunk in the water. In addition, it is possible to perform maintenance work without entirely retrieving the tidal power generating device from the water.

(2) According to the present embodiment, the blade 2 is continuously provided from the front portion to the rear portion on the outer periphery of the cylindrical body 1. This configuration increases the area to receive a tidal current and thus enhances power generation efficiency in comparison to conventional tidal power generating devices. The area to receive a tidal current can be further enlarged by increasing the length of the cylindrical body 1.

(3) According to the present embodiment, the power generator 5 and the speed-up gear 7 are accommodated in the cylindrical body 1. In this configuration, the attached portions and the shafts of the power generator 5 and the speed-up gear 7 are less likely to catch waste, thereby inhibiting unexpected stop or trouble. The tidal power generating device I is inclined upward from the rear portion to the front portion and the mooring nonrotary shaft 8 located at the front portion of the cylindrical body 1 is exposed above the water, so as to prevent the mooring nonrotary shaft 8 from catching waste.

(4) According to the present embodiment, the power generating nonrotary shaft 3, the connecting pipe 10, and the mooring nonrotary shaft 8 are hollow and each provided therein with a space. These configurations allow a person to enter the tidal power generating device I in operation (while the cylindrical body 1 is rotating) and enable maintenance work even in operation of the tidal power generating device I. There can be provided with the power cable 15 that passes through these interior spaces, so as to transmit electricity generated by the power generator 5. The tidal power generating device is not essentially provided with a hull and the like, which enables reduction in cost.

(5) According to the present embodiment, the power generating nonrotary shaft 3, the connecting pipe 10, and the mooring nonrotary shaft 8 are not rotated by a tidal current whereas the cylindrical body 1 is rotated. In this configuration, even when a tidal current is reversed, only the cylindrical body 1 is rotated reversely. Electricity can be thus generated even by such reverse currents.

(6) According to the present embodiment, the mooring rope 13 is connected to the mooring nonrotary shaft 8, and the mooring rope 14 is connected to the mooring rotary shaft 9 that is provided to the cylindrical body 1. In these configurations, the mooring ropes 13 and 14 do not rotate and are less likely to be twisted even when the cylindrical body 1 rotates. The security lighting 18 provided to the tidal power generating device I prevents ships from colliding with the tidal power generating device I during nighttime or the like to secure safety.

2. Second Embodiment

Described next is a tidal power generating device II according to the second embodiment. The tidal power generating device II according to the second embodiment is different from the tidal power generating device I according to the first embodiment mainly in terms of the configuration of the blade, provision of the speed-up gear, and provision of the security lighting. Described mainly in the second embodiment are these differences from the first embodiment. The configurations similar to those of the first embodiment are not described repeatedly and are denoted by identical reference signs.

2-1. Configuration of Tidal Power Generating Device

Figure 6:
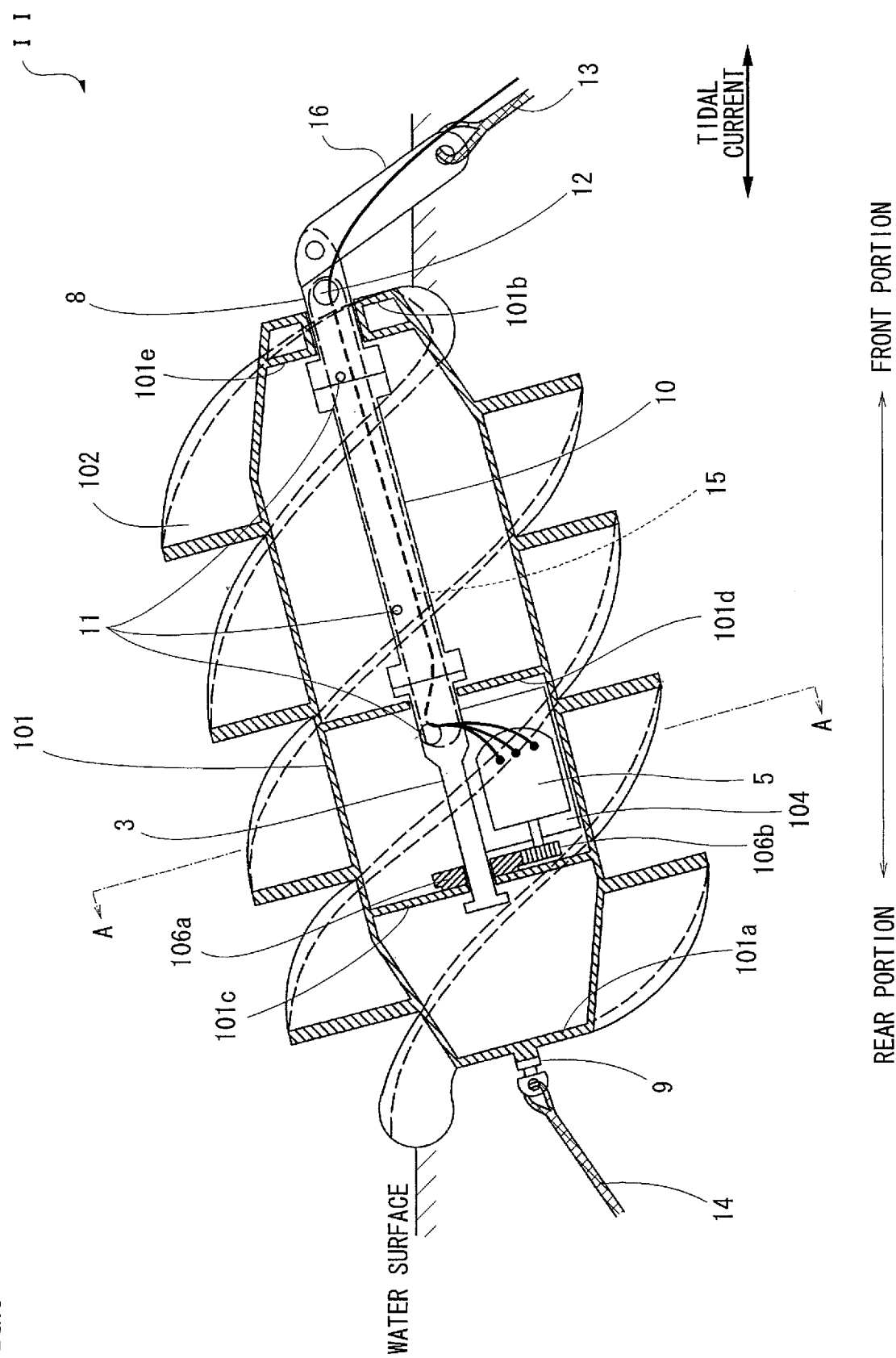
FIG. 6 is a side view of an internal structure of a tidal power generating device according to a second embodiment.
Figure 7:
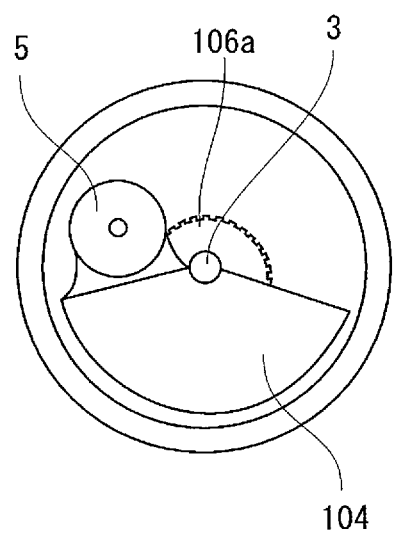
FIG. 7 is an enlarged end view taken along line A-A in FIG. 6 (with no blade 102 being included)

FIG. 6 is a side view of an internal structure of the tidal power generating device II according to the second embodiment of the present invention. FIG. 7 is an enlarged end view taken along line A-A in FIG. 6 (with no blade 102 being included).

As shown in FIG. 6, the tidal power generating device II includes a cylindrical body 101 and a plurality of blades 102 that is continuously provided from a front portion to a rear portion on an outer periphery and has torsion in a single direction. The cylindrical body 101 is tapered at around two axial ends, and has a first bottom 101a that is located at a front end and has a circular disk shape and a second bottom 101b that is located at a rear end and has a circular disk shape.

The cylindrical body 101 is further provided with a first partition 101c, a second partition 101d, and a third partition 101e each of which has a circular disk shape and divides a hollow interior space. The first bottom 101a, the first partition 101c, the second partition 101d, and the third partition 101e are each provided, at the center thereof, with a hole through which a power generating nonrotary shaft 3, a connecting pipe 10, or a mooring nonrotary shaft 8, to be described later, passes.

As shown in FIG. 6, the cylindrical body 101 is provided therein with the power generating nonrotary shaft 3 coaxially at the rear portion of the cylindrical body 101, the mooring nonrotary shaft 8 coaxially at the front portion thereof, and the connecting pipe 10 connecting the power generating nonrotary shaft 3 and the mooring nonrotary shaft 8. The power generating nonrotary shaft 3 has a fan-shaped weight 104 fixed thereto. The fan-shaped weight 104 has a power generator 5 fixed thereto (see FIG. 7). The power generator 5 according to the second embodiment is provided with no first pulley 5a.

The first partition 101c of the cylindrical body 101 has a first gear wheel 106a fixed thereto. The power generator 5 has a shaft to which a second gear wheel 106b is attached. The first gear wheel 106a and the second gear wheel 106b engage with each other. Rotation of the cylindrical body 101 causes the first gear wheel 106a to rotate, and rotation of the first gear wheel 106a is transmitted to the second gear wheel 106b to cause the second gear wheel 106b to rotate. In these configurations, rotation of the cylindrical body 101 is transmitted to the first gear wheel 106a, the second gear wheel 106b, and the power generator 5 in this order, and the power generator 5 thus generates electricity. The other configurations are not described because they are similar to those of the tidal power generating device I according to the first embodiment.

2-2. Exemplary Placement of Tidal Power Generating Device

Figure 8:
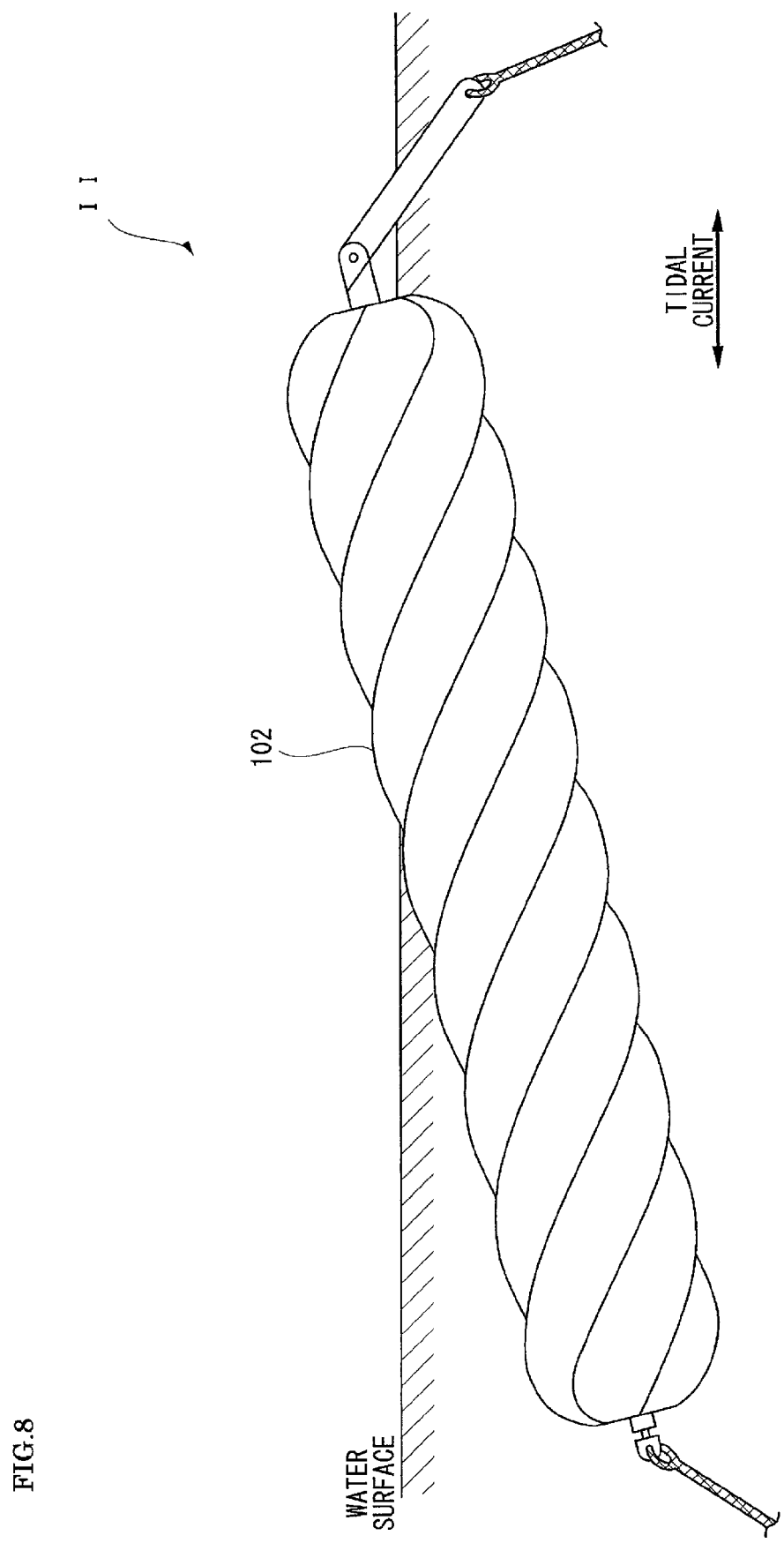
FIG. 8 is an explanatory view showing an exemplary placement state of the tidal power generating device according to the second embodiment.

FIG. 8 is an explanatory view from a side, showing an exemplary placement state of the tidal power generating device II. As shown in FIG. 8, the tidal power generating device II can be placed such that the rear portion is sunk and the entire body is inclined upward from the rear portion to the front portion, for example. In this state, the blades 102 are capable of receiving a fast tidal current in the water surface and shallow regions. Furthermore, a tidal current entirely hits the blades 102 from the front portions to the rear portions, thereby increasing the pressure receiving areas. The mooring nonrotary shaft 8 located at the front portion of the cylindrical body 101 is exposed above the water, so as to prevent the mooring nonrotary shaft 8 from catching waste.

2-3. Effects of the Present Embodiment

The tidal power generating device II according to the present embodiment achieves the following effects.

(1) According to the present embodiment, the tidal power generating device II is provided with the cylindrical body 101 that floats by itself. The cylindrical body 101 floats on the water while the rear portion thereof is sunk by the fan-shaped weight 104. The tidal power generating device II can be thus used in the water surface region where a current is relatively fast. The tidal power generating device is favorable in terms of the waterproof property in comparison to those which are sunk in the water. In addition, it is possible to perform maintenance work without entirely retrieving the tidal power generating device from the water.

(2) According to the present embodiment, the blades 102 are continuously provided from the front portion to the rear portion on the outer periphery of the cylindrical body 101. This configuration increases the areas to receive a tidal current, and thus enhances power generation efficiency in comparison to conventional tidal power generating devices. The areas to receive a tidal current can be further enlarged by increasing the length of the cylindrical body 101.

(3) According to the present embodiment, the power generator 5 is accommodated in the cylindrical body 101. In this configuration, the attached portion and the shaft of the power generator 5 are less likely to catch waste, thereby inhibiting unexpected stop or trouble. The tidal power generating device II is inclined upward from the rear portion to the front portion and the mooring nonrotary shaft 8 located at the front portion of the cylindrical body 101 is exposed above the water, so as to prevent the mooring nonrotary shaft 8 from catching waste.

3. Other Embodiments

The preferred embodiments of the present invention have been described above with reference to the drawings. Various addition, modification, or deletion can be applied to these embodiments as long as not departing from the purpose of the present invention. For example, the blade is not limited to those according to the embodiments of the present invention in terms of the shape, the torsion angle, and the number. Furthermore, the weight is not necessarily in the fan shape. The tidal power generating devices according to the embodiments of the present invention can be placed not only on the sea but also on a river that has a relatively large flow of water. Such modification is also included in the scope of the present invention.

What is claimed is:

1. A tidal power generating device comprising:
    a bottomed cylindrical body floating by itself;
    a blade provided continuously from a front portion to a rear portion on an outer periphery of the cylindrical body and has torsion in a single direction, wherein
    the cylindrical body includes therein:
    a power generating nonrotary shaft located coaxially at the rear portion of the cylindrical body;
    a weight fixed to the power generating nonrotary shaft; and a power generator fixed to at least one of the power generating nonrotary shaft and the weight, the power generator for generating electricity from torque of the cylindrical body.

2. The tidal power generating device according to claim 1, further comprising:
a mooring nonrotary shaft provided coaxially at the front portion of the cylindrical body; and
a connecting pipe connecting the power generating nonrotary shaft and the mooring nonrotary shaft.

3. The tidal power generating device according to claim 2, wherein the rear portion of the cylindrical body is sunk and the mooring nonrotary shaft is kept exposed above water.

4. The tidal power generating device according to claim 3, wherein the cylindrical body has an axis inclined from a direction of a tidal current at (90°—a torsion angle of the blade) such that the tidal current hits a lowermost portion of the blade at a right angle.

5. The tidal power generating device according to claim 2, further comprising:
a link arm bent downward and provided at a front end of the cylindrical body so as to be connected with the mooring nonrotary shaft;
a mooring rotary shaft provided at a rear end of the cylindrical body; and
mooring ropes connected to the mooring nonrotary shaft and the mooring rotary shaft, respectively.

6. The tidal power generating device according to claim 5, wherein the link arm has an angle of traverse limited so as to be kept in a "V" shape opened downward.

7. The tidal power generating device according to claim 2, further comprising:
a gear wheel fixed to the cylindrical body, the gear wheel for rotating coaxially with the cylindrical body, wherein torque of the cylindrical body is transmitted to the power generator by way of the gear wheel.

8. The tidal power generating device according to claim 2, further comprising:
a speed-up gear connected to the gear wheel and the power generator, the speed-up gear for transmitting torque of the cylindrical body to the power generator by way of the gear wheel.

9. The tidal power generating device according to claim 2, wherein
each of the power generating nonrotary shaft, the connecting pipe, and the mooring nonrotary shaft is provided with a hole through which a power cable passes.

10. The tidal power generating device according to claim 9, wherein
the hole is large enough for a person to pass through.

11. The tidal power generating device according to claim 10, further comprising:
a watertight door provided at an outer end of the mooring nonrotary shaft.

12. The tidal power generating device according to claim 2, wherein
the cylindrical body has tapered front and rear ends.

* * * * *